(12) United States Patent
Zhao

(10) Patent No.: US 10,863,048 B1
(45) Date of Patent: Dec. 8, 2020

(54) SYSTEM AND METHOD FOR NOISE MANAGED DOCUMENT PROCESSING OPERATIONS

(71) Applicant: Toshiba TEC Kabushiki Kaisha, Shinagawa-ku (JP)

(72) Inventor: Dehua Zhao, Irvine, CA (US)

(73) Assignee: Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 16/443,206

(22) Filed: Jun. 17, 2019

(51) Int. Cl.
*H04N 1/00* (2006.01)
*G06F 3/12* (2006.01)

(52) U.S. Cl.
CPC ....... *H04N 1/00954* (2013.01); *G06F 3/1205* (2013.01); *G06F 3/1261* (2013.01); *H04N 1/00925* (2013.01); *H04N 1/00994* (2013.01); *H04N 2201/0094* (2013.01)

(58) Field of Classification Search
CPC .......... H04N 1/00954; H04N 1/00994; H04N 1/00925; G06F 3/1205; G06F 3/1261
USPC ........................................................ 358/1.14
See application file for complete search history.

(56) References Cited

U.S. PATENT DOCUMENTS

2010/0123753 A1* 5/2010 Murahashi ........... B41J 2/17509
347/19

* cited by examiner

*Primary Examiner* — Saeid Ebrahimi Dehkordy
(74) *Attorney, Agent, or Firm* — Ulmer & Berne LLP

(57) ABSTRACT

A system and method for noise management for printers includes a processor that retrieves temporal data indicative of a current day or time. A print job is received via a network interface. The processor determines a relative noise level associated with printing of the print job and modifies a printing operation of an electronic document associated with a received print job in accordance with a determined, relative noise level and retrieved temporal data.

18 Claims, 4 Drawing Sheets

SYSTEM AND METHOD FOR NOISE MANAGED DOCUMENT PROCESSING OPERATIONS

TECHNICAL FIELD

This application relates generally to decreasing ambient noise at workplaces. The application relates more particularly to decreasing ambient noise associated with document processing operations by selecting devices or timing of print jobs to minimize noise exposure to employees.

BACKGROUND

Background noises at work, even relatively benign ambient noises, can problematic. Research by Kim and de Dear at the University of Sydney revealed that 30 percent of workers in cubicles and around 25 percent in partition-less offices were unhappy with noise levels at work. Their research repeatedly links office noise to reduced cognitive performance. One study found that workers lost as much as 86 minutes a day in productivity due to noise distractions.

In severe or prolonged cases, noise levels can cause ear damage. Sound pressure levels are typically measured in decibels (dB), which is an unweighted value. A-weighted decibels (dBA), are an expression of relative loudness of sounds in air as perceived by the human ear. In the A-weighted system, decibel values of sounds at low frequencies are reduced, compared with unweighted decibels, in which no correction is made for audio frequency. In the United States, the Occupational Safety and Health Administration (OSHA), sets a maximum allowable sustained sound level for an eight hour workday at 90 dBA, roughly the noise level of a motorcycle 25 feet (7.6 meters) away. Certain countries or states have even more stringent standards. For example, in California, Cal/OSHA sets the maximum sustained sound level for an eight our day at 85 dBA, roughly equivalent to the noise of a diesel truck travelling at 40 miles per hour (65 kilometers per hour), 50 feet (15 meters) away. Violation of noise restrictions can result in fines, or other civil or even criminal penalties.

BRIEF DESCRIPTION OF THE DRAWINGS

Various embodiments will become better understood with regard to the following description, appended claims and accompanying drawings wherein:

DETAILED DESCRIPTION

Figure 1:
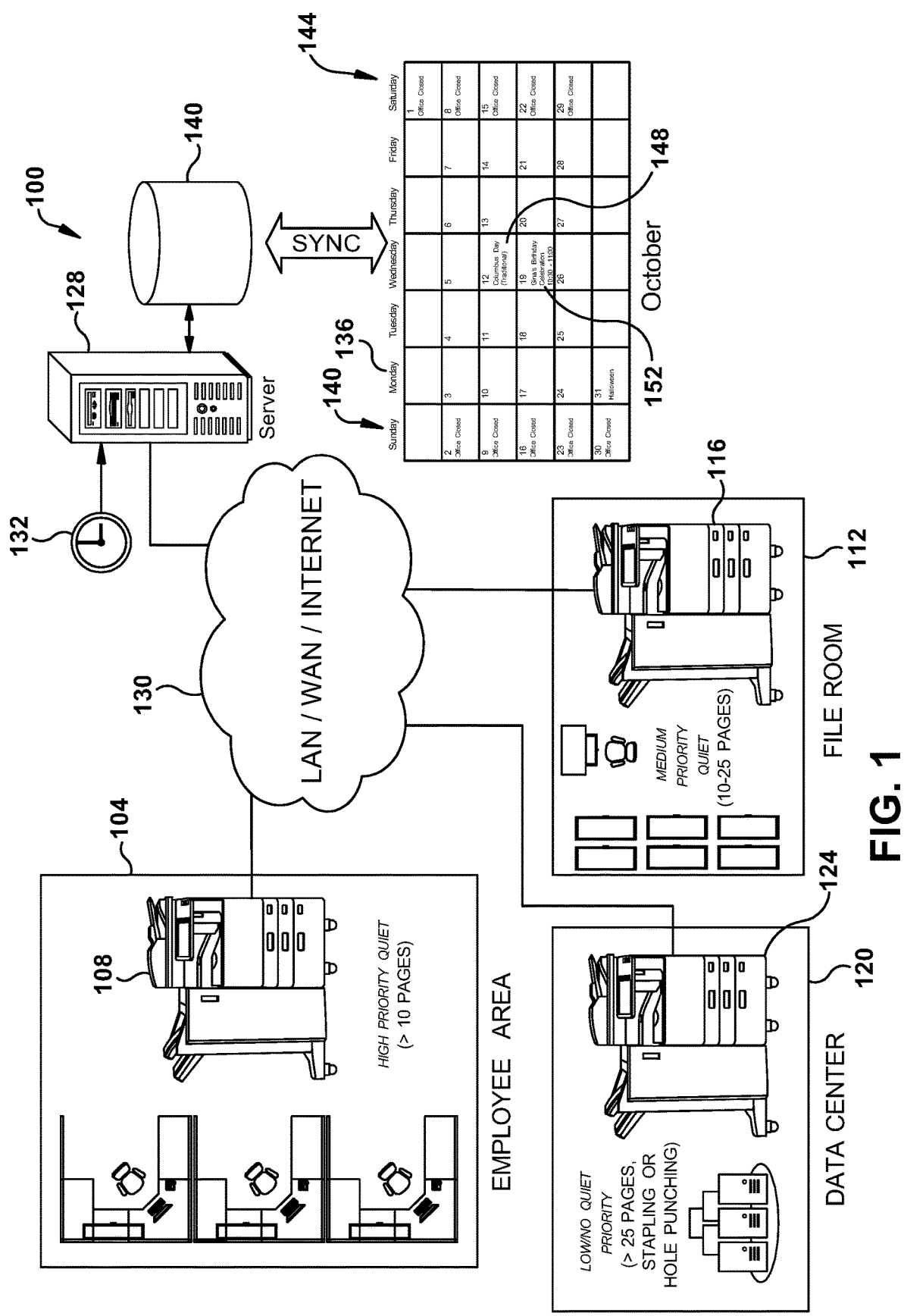
FIG. 1 an example embodiment of a document processing device noise management system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with example embodiments detailed herein, a processor retrieves temporal data indicative of a current day or time. A print job is received via a network interface. The processor determines a relative noise level associated with printing of the print job and modifies a printing operation of an electronic document associated with a received print job in accordance with a determined, relative noise level and retrieved temporal data.

Document processing devices include printers, copiers, scanners and e-mail gateways and more recently, devices employing two or more of these functions referred to as multifunction peripherals (MFPs) or multifunction devices (MFDs). As used herein, MFPs are understood to comprise printers, alone or in combination with other of the aforenoted functions. It is further understood that any suitable document processing device can be used.

Document processing operations, particularly operations such as scanning, printing or copying, require mechanical activity by MFPs, including device operations such as picking and transiting of paper, movement of print heads, operation of electrostatic printing units, and operation of fixing rollers, movement of a scanner bar across a platen. Modern MFPs may also include finish options such as stapling, binding or hole punching of printouts. Some print jobs are quite large and require device operation over a considerable period of time. Some operations generate multiple copies, requiring large print times as well as operation of a mechanical collator.

Operations such as stapling, binding collation or hole punching may be associated with particularly high noise levels. In office environments, it is common to have multiple MFPs relatively proximate to one another. Devices may be next to one another, or sufficiently close to be simultaneously in earshot to multiple workers. Concurrent device operations, including operation of multiple components on a single MFP, as well as concurrent operations of multiple MFPs, result in additive noise levels from superposition of overlapping soundwaves emanating from the devices. Such super-positioning, referred to as constructive wave interference, can result in sound levels many times higher, possibly resulting in an even higher risk of violation of sound level regulations.

In accordance with the subject application, FIG. 1 illustrates an example embodiment of a document processing device noise management system 100. In the example, a business includes several areas, including employee area 104 housing MFP 108, file room 112 housing MFP 116, and data center 120 housing MFP 124. While one MFP for each area is illustrated in the example, it will be appreciated that each area may include two or more MFPs. Employee area 104 has a relatively high density of employees that are within earshot of MFP 108. File room 112 has a relatively lower density of employees within earshot of MFP 116. Data center 120 has the fewest, if any, employees within earshot of MFP 124. Accordingly, employee area 104 is designated as a high priority quiet area, file room 112 is designated as a medium priority quiet area and data center 120 is designated as a low or no priority quiet area. In accordance with the illustrated example, quiet jobs are directed for printing at MFP 108, print jobs associated with intermediate noise levels are directed for printing at MFP 116, and remaining print jobs are directed for printing at MFP 124, in accordance with application of other factors. Server 128 is provided with time/date input 132 for current temporal information. An electronic calendar or diary 136 is maintained in storage 140, and is suitably synched with updated events, such as holidays, vacation shutdowns, employee absences, or the like. A printing noise level can be determined by a processor programmed to analyze a print job. The processor can determine approximate or relative noise levels by analyzing print job characteristics such as number of pages, collation, hole punching, stapling, duplex printing, and the like. Printing characteristics can be determined, for example, by review of page description language data (PDL) associated with a print job. Noise levels can further be determined based on particular printer properties. Some devices may have known noise characteristics. By way of example, one brand of MFP may have a relatively quiet collation system compared to an alternative printer. In accordance with embodiments described herein, a particular print job may be acceptable in a quiet area given properties of an MFP in the quiet area, while other printers in the quiet area would not be usable for that job. Thus, if a user sends a job to a particular MFP in the quiet area, the system can reroute the job to another MFP in the quiet area if one is available. If not, the job will be suspended for a time or rerouted to another print area.

Printing noise is less problematic when printing is done outside of work hours. A print job submission may include a requested printer for output, or may default to a preselected printer. A noisy print job, such as a lengthy job or one requiring collating or finishing options, can be printed at any printer, including selected or one nearby, if printing is requested outside of business hours. In the illustrated example, business hour exceptions may include weekend days 140 and 144, holiday 148 or employee breaks, such as noon-1:00 for lunch or office celebrations, such as birthday Gina's birthday celebration 152.

A print server, such as server 128 suitably routes print jobs to one or more printers. It will be appreciated that an MFP, which includes a computer functioning as an intelligent controller, can also function in the capacity of a print server. MFPs 108, 116 and 124 are in data communication via network cloud 130, suitably comprised of any wireless or wired data connection, and suitably comprised of a local area network (LAN), wide area network (WAN), which may comprise the Internet, or any suitable combination thereof.

Figure 2:
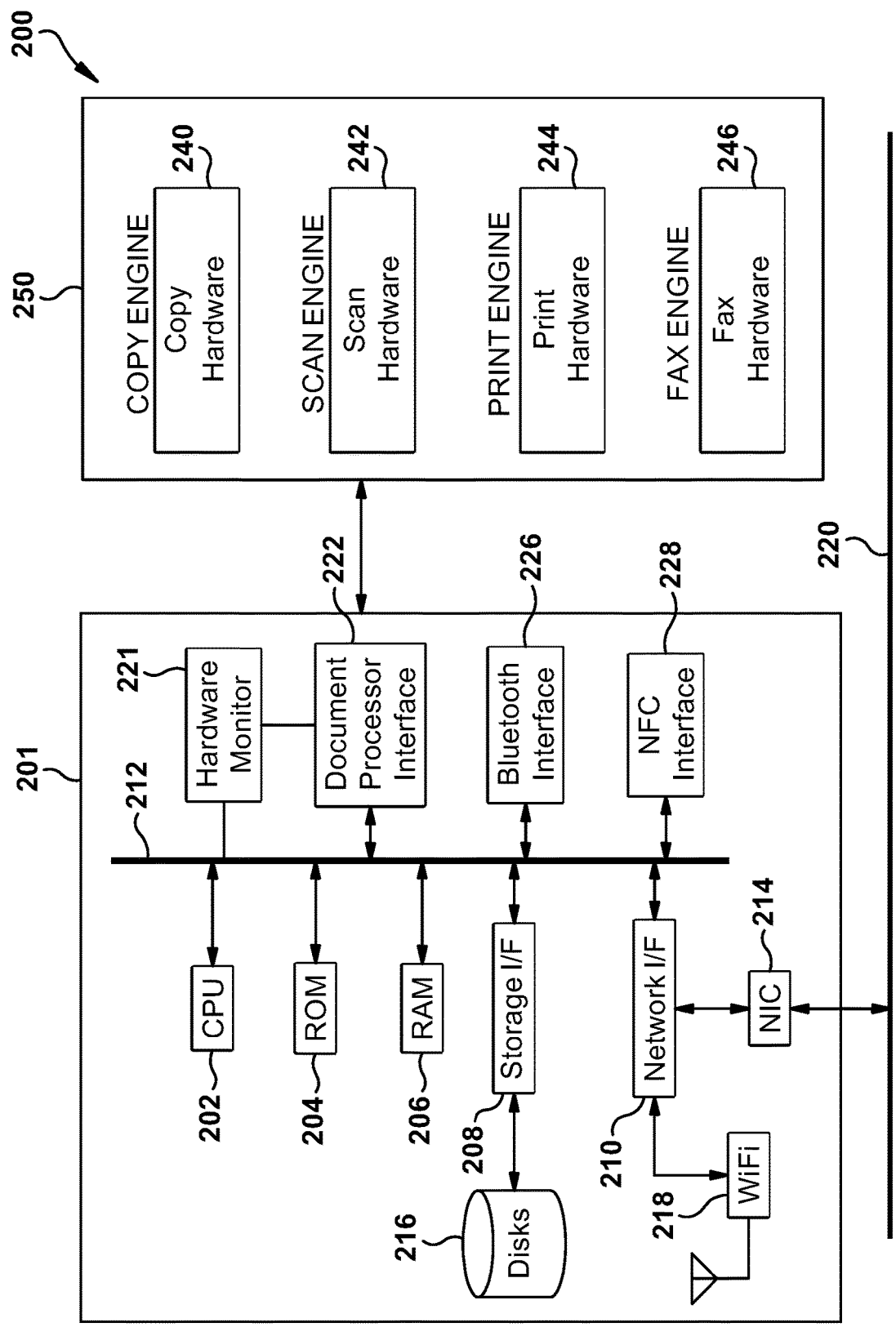
FIG. 2 is an example embodiment of a networked digital device document rendering system.

Turning now to FIG. 2 illustrated is an example embodiment of a networked digital device comprised of document rendering system 200 suitably comprised within an MFP, such as with MFPs 108, 116 and 124 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
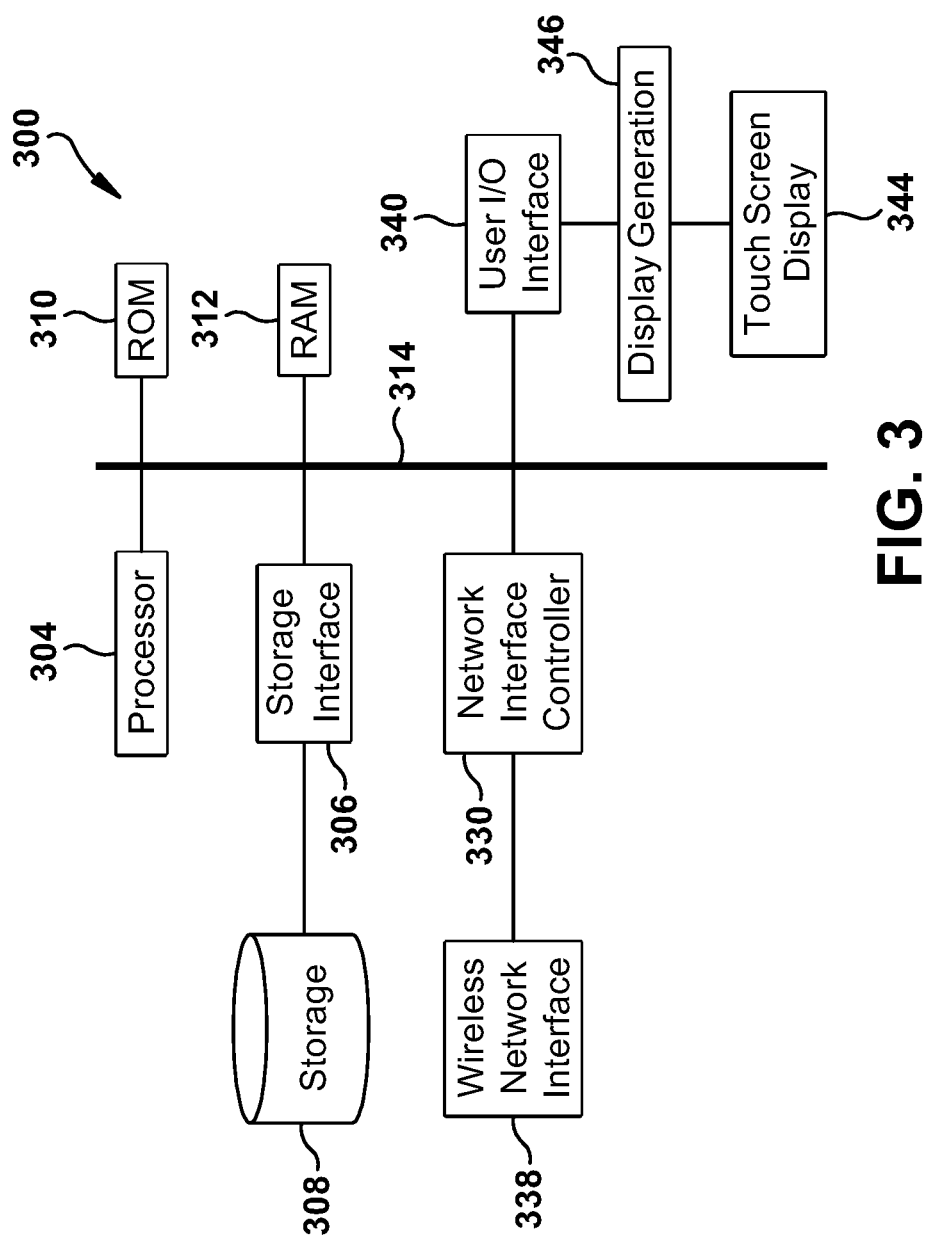
FIG. 3 is an example embodiment of a digital device system.

Turning now to FIG. 3, illustrated is an example of a digital device system 300 suitably comprising server 128 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide arear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
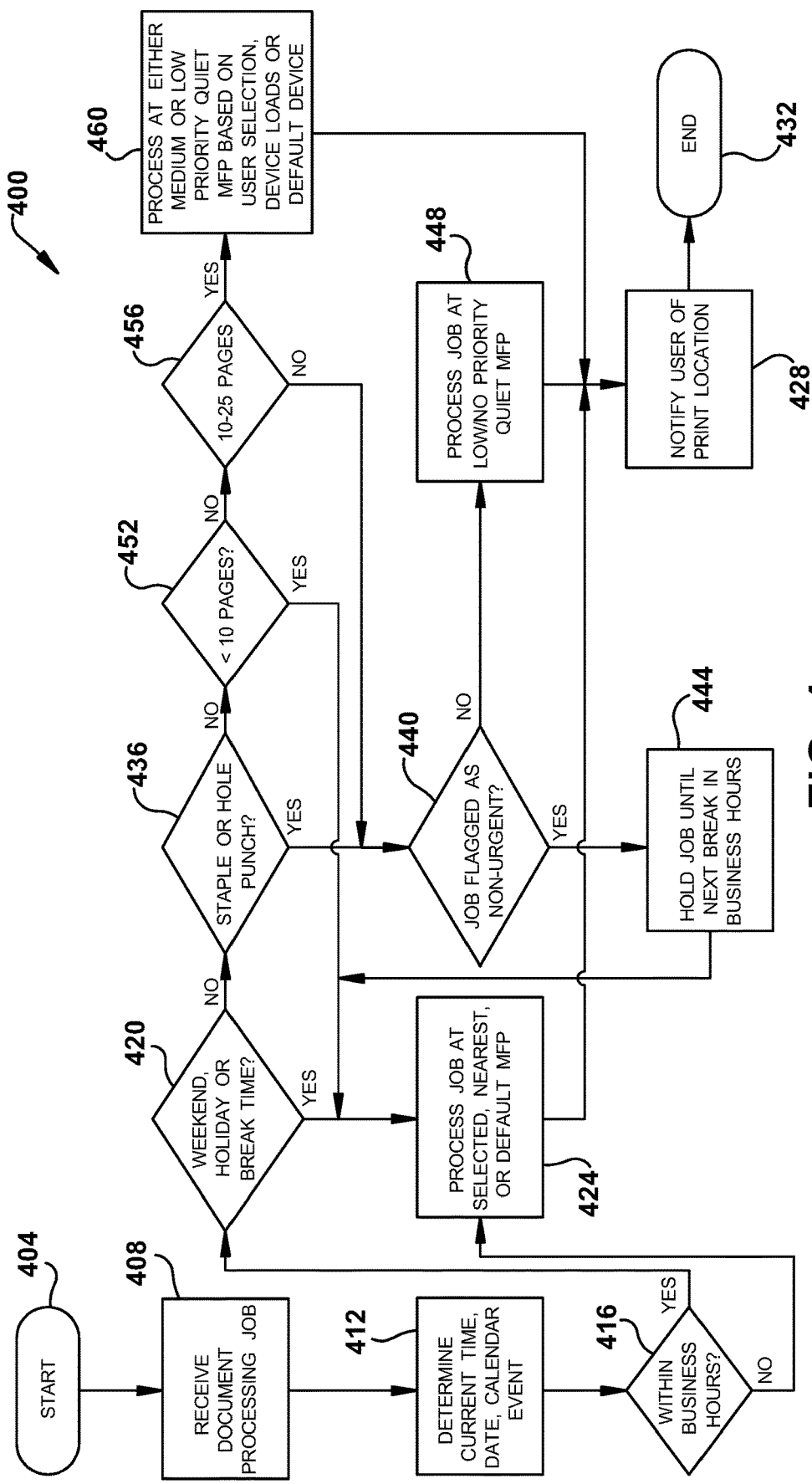
FIG. 4 is an example embodiment of a document processing device noise management system.

FIG. 4 illustrates a flowchart 400 of an example embodiment of a document processing device noise management system. The process commences at block 404, and proceeds to block 408 where a document processing job is received. A document processing job may include an electronic document, or direct retrieval of an electronic document from a local or remote storage. A job may also include information such as a designated or default printer, a number of copies, finishing options, such as collation, stapling, hole punching or binding. A job may also indicated where the job is coming from, such as a user or device identifier, for communications back to the submitter. A job may also specify if a print job is urgent, or can wait and be processed at some future time.

Next, temporal information, such current time, current date or calendar events is retrieved at block 412. A test is made at block 416 to determine if the job was submitted during business hours. If not, the job is suitably processed at the selected MFP, a nearest MFP or a default MFP at block 424. The submitter is notified of the printing and printing location at block 428, and the process ends at block 432.

If a determination is made at block 416 that the job was submitted for printing during business hours, a determination is made at block 420 as to whether the print job coincides with a weekend, holiday or break time, any or all of which provide exceptions to standard business hours. If an exception is present, the process is also passed on to block 424, proceeding as detailed above.

If no business hours exception is determined at block 420, a test is made as to whether the job includes defined noise parameters, such as requesting finishing options, including stapling or hole punching. If so, a determination is made at block 440 if the job was flagged as non-urgent. If so, the job is delayed at block 444 until a subsequent break in business hours, and then processed at block 424 as detailed above. If the job is determined to be urgent at block 440, it is routed to be printed in an area with low or no quietness priority at block 448, and the process moves to block 428 as detailed above.

If no defined noisy event is determined to exist at block 436, a determination is made as to a printout size. In the example, less than 10 pages is set as acceptable for printing anywhere, although it is to be appreciated that any suitable page range can be specified. If less than 10 pages will result in the printout, the process proceeds to block 424 as detailed above.

If it is determined that more than 10 pages will be printed at block 452, a test is made at block 456 to determine if an intermediate range of pages is present, the range being set at 10-25 pages in the illustrated example. If so, the job can be processed at either a medium or low priority quietness level MFP at block 460, suitably one the user selected if it falls within these two areas. If no selection is made that falls within these areas, the printout is suitably done in a default print area or one that is based on device loads. The process then proceeds to block 428 for handling as detailed above. If it is determined at block 456 that greater than 25 pages will be printed, the process returns to block 440 and proceeds as detailed above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a network interface configured to receive a print job;
   a memory storing data indicative of a plurality of network printers, each network printer associated with data corresponding to a noise sensitivity level; and
   a processor configured to
      retrieve temporal data indicative of a current day or time, the temporal data further including digital calendar data indicative of active and inactive business periods,
      determine a relative noise level associated with printing of the print job, and
      modify a printing operation of an electronic document associated with the received print job in accordance with the determined, relative noise level and the retrieved temporal data.

2. The system of claim 1 wherein the digital calendar data includes data corresponding to one or more of days of the week, time of day or calendar entry.

3. The system of claim 2 wherein the digital calendar data includes data corresponding to business holidays.

4. The system of claim 1 wherein the processor is further configured to modify the printing operation by suspending printing of the electronic document until the temporal data indicates a current day or time outside of active business hours.

5. The system of claim 1 wherein the processor is further configured to modify the printing operation by routing the print job to an alternative printer.

6. The system of claim 1 wherein the relative noise level is associated with a size of a printout of the electronic document.

7. The system of claim 1 wherein the relative noise level is associated with one or more of stapling or hole punching of a printout of the electronic document specified by the print job.

8. A method comprising:
   retrieving, via a processor, temporal data indicative of a current day or time, the temporal data further including digital calendar data indicative of active or inactive business periods;
   retrieving data indicative of a plurality of network printers, each network printer associated with data corresponding to a noise level sensitivity;
   receiving a print job into memory;
   determining a relative noise level associated with printing of the print job; and
   modifying a printing operation of an electronic document associated with a received print job in accordance with the determined, relative noise level and the retrieved temporal data.

9. The method of claim 8 wherein the digital calendar data includes data corresponding to one or more of days of the week, time of day or calendar entry.

10. The method of claim 9 wherein the digital calendar entry includes data corresponding to business holidays.

11. The method of claim 8 further comprising modifying the printing operation by suspending printing of the electronic document until the temporal data indicates a current day or time outside of active business hours.

12. The method of claim 8 further comprising modifying the printing operation by routing the print job to an alternative printer.

13. The method of claim 8 wherein the relative noise level is associated with a size of a printout of the electronic document.

14. The method of claim 8 wherein the relative noise level is associated with one or more of stapling or hole punching of a printout of the electronic document specified by the print job.

15. A system comprising:
   a processor;

a digital clock;

a network interface; and a memory storing a digital calendar including data indicative of active and inactive business periods, wherein the memory further stores data indicative of a plurality of network printers, each network printer associated with data corresponding to a noise sensitivity level, wherein the processor is configured to receive print job data via the network interface, wherein the processor is further configured to determine a noise level associated with printing of an electronic document associated with received print job data, and wherein the processor is further configured to modify a print operation associated with printing of the electronic document in accordance with a determined noise level and the digital calendar.

16. The system of claim 15 wherein the processor is further configured to modify the print operation by directing a print operation of the electronic document to a printer in accordance with an associated noise sensitivity level.

17. The system of claim 16 wherein the noise level is determined in accordance with one or more of a size of a printout associated with the electronic document and a finishing operation for printing of the electronic document specified by the print job.

18. The system of claim 15 wherein the processor is further configured modify the print operation by suspending printing of the electronic document until an inactive business period.

* * * * *